(12) United States Patent
Yamaki et al.

(10) Patent No.: US 10,288,780 B2
(45) Date of Patent: *May 14, 2019

(54) REFLECTIVE TRANSPARENT SCREEN AND IMAGE PROJECTION DEVICE COMPRISING SAME

(71) Applicant: JXTG NIPPON OIL & ENERGY CORPORATION, Tokyo (JP)

(72) Inventors: Kousuke Yamaki, Tokyo-to (JP); Akira Matsuo, Tokyo-to (JP)

(73) Assignee: JXTG NIPPON OIL & ENERGY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/780,283

(22) PCT Filed: Nov. 21, 2016

(86) PCT No.: PCT/JP2016/084513
§ 371 (c)(1),
(2) Date: May 31, 2018

(87) PCT Pub. No.: WO2017/094550
PCT Pub. Date: Jun. 8, 2017

(65) Prior Publication Data
US 2018/0348411 A1   Dec. 6, 2018

(30) Foreign Application Priority Data
Dec. 2, 2015  (JP) .................. 2015-235695

(51) Int. Cl.
G02B 5/02  (2006.01)
G03B 21/60  (2014.01)
(Continued)

(52) U.S. Cl.
CPC ............ *G02B 5/0284* (2013.01); *G02B 5/02* (2013.01); *G02B 5/0226* (2013.01);
(Continued)

(58) Field of Classification Search
CPC ....................................... G03B 21/60
(Continued)

(56) References Cited

U.S. PATENT DOCUMENTS 6,144,491 A * 11/2000 Orikasa ................. G03B 21/60
                                                            359/452
6,404,548 B1 * 6/2002 Tatsuki .................. G03B 21/60
                                                            359/443
(Continued)

FOREIGN PATENT DOCUMENTS

| | | |
|---|---|---|
| JP | 10-282578 | 10/1998 |
| JP | 2001-242546 | 9/2001 |

(Continued)

OTHER PUBLICATIONS

Boccas et. al. Thin Solid Films, 502, 275 (Year: 2006).*
(Continued)

*Primary Examiner* — Christopher E Mahoney
(74) *Attorney, Agent, or Firm* — Wenderoth, Lind & Ponack, L.L.P.

(57) ABSTRACT

A reflective transparent screen according to the present invention comprises a light diffusion layer which comprises a binder and microparticles. The reflective transparent screen has a total light transmission of 60% or more and a parallel beam transmittance of 50% or more. The transparent screen has the diffuse reflectance light brilliance profile measured with a goniophotometer characterized to satisfy the conditions A and B.

18 Claims, 3 Drawing Sheets

(51) Int. Cl.
   *G03B 21/00* (2006.01)
   *G03B 21/14* (2006.01)
   *H04N 5/74* (2006.01)

(52) U.S. Cl.
   CPC .......... *G02B 5/0278* (2013.01); *G03B 21/00* (2013.01); *G03B 21/14* (2013.01); *G03B 21/60* (2013.01); *H04N 5/74* (2013.01)

(58) Field of Classification Search
   USPC ........................................ 359/452, 449, 459
   See application file for complete search history.

(56) References Cited

U.S. PATENT DOCUMENTS

| | | | |
|---|---|---|---|
| 8,372,505 | B2 | 2/2013 | Etori et al. |
| 10,018,754 | B2* | 7/2018 | Matsuo ................ B32B 7/02 |
| 2001/0005282 | A1 | 6/2001 | Etori et al. |
| 2006/0098279 | A1* | 5/2006 | Yamauchi ............. G03B 21/56 |
| | | | 359/449 |
| 2006/0176553 | A1 | 8/2006 | Bertin-Mourot et al. |
| 2009/0225416 | A1* | 9/2009 | Teather ................. G03B 21/60 |
| | | | 359/449 |
| 2010/0165459 | A1* | 7/2010 | Lin ........................ G03B 21/60 |
| | | | 359/454 |
| 2010/0189956 | A1 | 7/2010 | Etori et al. |
| 2011/0149389 | A1* | 6/2011 | Sharp ................ B29D 11/0074 |
| | | | 359/452 |
| 2012/0013851 | A1* | 1/2012 | Liu ........................ G03B 21/56 |
| | | | 353/29 |
| 2015/0062537 | A1* | 3/2015 | Kim ...................... G03B 21/60 |
| | | | 353/30 |
| 2015/0153639 | A1 | 6/2015 | Tokunaga |
| 2017/0059982 | A1* | 3/2017 | Watanabe ............... G02B 5/02 |
| 2018/0045957 | A1* | 2/2018 | Yamaki .................... B32B 7/02 |

FOREIGN PATENT DOCUMENTS

| | | |
|---|---|---|
| JP | 2005-99675 | 4/2005 |
| JP | 2006-146019 | 6/2006 |
| JP | 2006-518477 | 8/2006 |
| JP | 2007-240686 | 9/2007 |
| JP | 2008-112040 | 5/2008 |
| JP | 2010-122559 | 6/2010 |
| JP | 2010-138270 | 6/2010 |
| JP | 4571691 | 10/2010 |
| JP | 2011-113068 | 6/2011 |
| JP | 2013-182141 | 9/2013 |
| JP | 2014-153708 | 8/2014 |
| JP | 2015-212800 | 11/2015 |

OTHER PUBLICATIONS

Barchiesi et al. Journal of Nanophotonics vol. 8 (Year: 2014).*
International Search Report dated Jan. 31, 2017 in International Application No. PCT/JP2016/084513.
Japanese Office Action dated May 23, 2017 in corresponding Japanese patent application No. 2017-519949, with English translation.
International Preliminary Report on Patentability dated Jun. 14, 2018 in International Application No. PCT/JP2016/084513.
Office Action dated Jul. 16, 2018 in corresponding Korean Patent Application No. 10-2018-7014149, with machine translation.

* cited by examiner

REFLECTIVE TRANSPARENT SCREEN AND IMAGE PROJECTION DEVICE COMPRISING SAME

TECHNICAL FIELD

The present invention relates to a reflective transparent screen satisfying both visibilities of projection light and transmitted light by anisotropical diffuse reflection of projection light emitted from a light source. The present invention also relates to an image projection device comprising the reflective transparent screen and a projection device.

BACKGROUND ART

Conventionally, a combination of a Fresnel lens sheet and a lenticular lens sheet has been used for a projector screen. In recent years, there is a growing a demand for displaying merchandise information, advertisement, or the like by projection on a show window of a department store or the like, a transparent partition of an event venue, or the like while maintaining the transparency thereof. It is said that, in the future, there will be a further increasing demand for a highly transparent projection type image display screen which is used for a head-up display, a wearable display, or the like.

However, since a conventional projector screen is low in transparency, there is a technical problem that such a projector screen cannot be applied to a transparent partition, or the like. Accordingly, a screen having a recess on its surface is proposed as a projector screen (see Patent Document 1). Further, a film for a highly transparent reflective screen composed of a polymer film composed of a matrix phase and a disperse phase containing a thermoplastic resin is proposed (see Patent Document 2).

In order to prevent a reflection on the surface of a variety of screens such as a transmission type screen or a reflection type screen, it is proposed that an antiglare member having an antiglare layer composed of black microparticles and a transparent binder is disposed on the surface of such screens (see Patent Document 3). Further, in order to prevent the contrast from decreasing, it is proposed to provide a transmission type screen on which a condenser is provided (Patent Document 4). Still further, it is proposed to provide a reflection type screen comprising a substrate, an optical absorbing layer, an optical multilayer film, and an optical diffusion layer in the order mentioned (see Patent Document 5).

RELATED ART DOCUMENTS

Patent Documents

Patent Document 1 Japanese Unexamined Patent Application Publication No. 2006-146019
Patent Document 2 Japanese Unexamined Patent Application Publication No. 2008-112040
Patent Document 3 U.S. Pat. No. 4,571,691
Patent Document 4 Japanese Unexamined Patent Application Publication No. 2007-240686
Patent Document 5 Japanese Unexamined Patent Application Publication No. 2005-99675

SUMMARY OF THE INVENTION

Problems to be Solved by the Invention

However, the present inventors found the following technical problems in Patent Documents 1 to 5. When a screen described in Patent Document 1 is applied to a transparent partition or the like of a show window or an event venue, there is a technical problem that the screen cannot maintain its performance for a long period since the concavoconvex portion wears with its usage. There is also a technical problem that a film clouds and the transparency is compromised since the diameter of optical diffusion particles is 1 to 20 µm. A screen described in Patent Document 2 is obtained by stretching in at least one direction in order to exhibit the anisotropy of refraction. However, the stretching for exhibiting the anisotropy of refraction has a technical problem that the property in the direction perpendicular to the stretched direction may be nonuniform, and a further improvement is desired. A screen described in Patent Document 3 has a technical problem that the transparency is poor and the screen is grayish due to the influence of carbon black since the screen comprises an antiglare member including black microparticles such as carbon black having an average particle size of 1 to 6 µm. There is a technical problem that the transparency is significantly compromised since a transmission type screen described in Patent Document 4 comprises a condenser. A reflection type screen described in Patent Document 5 comprises an optical multilayer film formed by layering a low refractive index layer made of a fluorine resin and a high refractive index layer containing a metal oxide, and there is a technical problem that light reflects on the interface of these layers, which compromises the transparency.

Means for Solving the Problems

The present invention has been made in view of the above-described technical problems, and an object of the present invention is to provide a reflective transparent screen satisfying both visibilities of projection light and transmitted light by anisotropical diffuse reflection of the projection light emitted from a light source. The present invention also has an object to provide an image projection device comprising the reflective transparent screen and a projection device.

Normally, in order to project a projection image clearly on a screen, brilliance in the specular reflection direction against the transmitted light from a projection device (a light source) is preferably low. This is because when the brilliance in the specular reflection direction is high, the specular reflection of projection light directly enters into viewers, causing glare. This is a phenomenon commonly called a hot spot. When the brilliance of diffuse reflectance light in the specular reflection direction is too high, strong hot spots appear on the screen so that a projection device with a high brilliance can not be used, resulting in difficulty to display a clear image. Also, since the screen is mostly used in an environment where light other than from the projection device, for example, a light source other than from the projection device, such as an illumination, is present, light from a light source other than from the projection device is also projected on the screen to further impair the view of the projection image. On the other hand, when the brilliance of light in the direction other than the specular reflection direction is high, the projection image becomes clear. This is because the diffuse reflectance (=other than specular reflection) of the emitted light from the projection device reaches to the observer's eyes so that one can recognize the diffuse reflectance light other than specular reflection as an image.

In order to solve the above described technical problems, the present inventors intensively studied to find that the above described technical problems can be solved with profiles of total light transmittance, parallel beam transmittance, and diffuse reflectance light brilliance of a reflective transparent screen, that satisfy a specific condition. Specifically, with respect to the diffuse reflectance light brilliance profile, the inventors have found that the higher brilliance of light diffused and reflected in the angle of 90 to 120 degrees against the parallel direction of the screen surface, when light was entered in a 45 degrees angle against the parallel direction of the screen surface, the image can be clearly visualized. The present invention has been completed based on such findings.

That is, according to one aspect of the present invention, provided is a reflective transparent screen comprising a light diffusion layer which comprises a binder and microparticles, wherein
the reflective transparent screen has a diffuse reflectance light brilliance profile measured with a goniophotometer characterized to satisfy the following conditions A and B:

A) a relative brilliance of a diffuse reflectance light at 90 degrees is 0.001 or more when a light entered in a 45 degrees angle against a parallel direction of a screen surface and when a brilliance in a specular reflection direction of 135 degrees is determined as 100; and B) the relative brilliance of the diffuse reflectance light at 120 degrees is 0.01 or more when the light entered in a 45 degrees angle against the parallel direction of the screen surface and when the brilliance in the specular reflection direction of 135 degrees is determined as 100.

According to an aspect of the present invention, thickness t (μm) of the light diffusion layer and concentration c (% by mass) of the microparticles based on the binder preferably satisfy the following formula (I):

$$0.04 \leq (t \times c) \leq 30 \qquad (I).$$

According to an aspect of the present invention, preferably, the microparticles are light reflective microparticles.

According to an aspect of the present invention, preferably, the light reflective microparticles have a shape of a substantially spherical form and a median diameter of primary particles from 0.1 to 2500 nm.

According to an aspect of the present invention, preferably, the light reflective microparticles have a shape of a flake form, an average diameter of primary particles from 0.01 to 100 μm, and an average aspect ratio from 3 to 800.

According to an aspect of the present invention, preferably, regular reflectance of the light reflective microparticles is from 12 to 100.

According to an aspect of the present invention, preferably, the light reflective microparticles are metallic particles selected from the group consisting of aluminum, silver, copper, platinum, gold, titanium, nickel, tin, tin-cobalt alloy, indium, chromium, titanium oxide, aluminum oxide, and zinc sulfide, a bright material of glass coated with metal or metallic oxides, or a bright material of natural or synthetic mica coated with metal or metallic oxides.

According to an aspect of the present invention, preferably, luminous reflectance Y is from 1% to 6.5%.

According to an aspect of the present invention, preferably, image clarity is 65% or more.

In another aspect of the present invention, provided is a member for a vehicle comprising the transparent screen described above.

In another aspect of the present invention, provided is a member for a house comprising the transparent screen described above.

In another aspect of the present invention, provided is an image projection device comprising the reflective transparent screen described above and a projection device which projects an image on the reflective transparent screen.

Effects of the Invention

According to the present invention, a reflective transparent screen can be provided, satisfying both visibilities of the projection light and the transmitted light by anisotropical diffuse reflection of the projection light emitted from a light source. Further, such a transparent screen is characterized in that hot spots are weak, light other than those from the projector is hardly projected, viewing angle is wide, and the image is clear.

MODE FOR CARRYING OUT THE INVENTION

<Reflective Transparent Screen>

Figure 1:
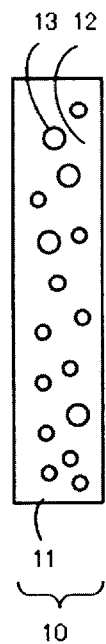
FIG. 1 is a cross-sectional view in the thickness direction of one embodiment of the transparent screen according to the present invention.

The transparent screen according to the present invention comprises a light diffusion layer comprising a binder and microparticles. Such transparent screen may be a single layer constitution consisting of the light diffusion layer only, or may be a laminate of a multilayer constitution comprising other layers such as a protection layer, a backing layer, an adhesive layer, and an antiglare layer. The transparent screen may also comprise a support like glass, a transparent partition, or the like. The transparent screen is capable of satisfying both visibilities of the projection light and the transmitted light by anisotropical diffuse reflection of the projection light emitted from a light source.

Such transparent screen is suitable for use as a reflective screen (a front projection type screen). A reflective screen is a screen that allows visibility of an image projected on the screen from the same side as the projector. In the image projection device comprising the transparent screen according to the present invention, the projection device (the light source) is placed on the observer's side against the screen. Specifically, a projection device can be provided, which allows simultaneous visibility of the screen background and the projected image by placing the projection device that projects the image from an angle of ±10° or more against the normal direction of the screen surface.

The transparent screen may be a plane surface or a curved surface. For example, the transparent screen is suitable for use as a glass window, a head up display, a wearable display, and the like, and in particular, it is suitable for use as a transparent screen for a short focus type projector. Further, the transparent screen according to the present invention is suitably used in members for a vehicle or a house. In the present invention, the term "transparent" means transparent in the degree that transmission visibility depending on the applications can be attained and also includes being "translucent".

The reflective transparent screen has a diffuse reflectance light brilliance profile measured with a goniophotometer satisfying the following conditions A and B:

A: the relative brilliance of the diffuse reflectance light at 90 degrees is 0.001 or more, preferably from 0.002 to 1, and more preferably from 0.004 to 0.5 when the light entered in a 45 degrees angle against the parallel direction of the screen surface and when the brilliance in the specular reflection direction of 135 degrees is determined as 100; and B: the relative brilliance of the diffuse reflectance light at 120 degrees is 0.01 or more, preferably from 0.02 to 2, and more preferably from 0.03 to 1.5 when the light entered in a 45 degrees angle against the parallel direction of the screen surface and when the brilliance in the specular reflection direction of 135 degrees is determined as 100.

By satisfying conditions A and B, the brilliance of light that diffuse reflects in the angles at 90 degrees and 120 degrees will be within a suitable range at the time when light entered in a 45 degrees angle against the parallel direction of the screen surface. Therefore, the hot spots on the screen will be weak, light from those other than from the projector is hardly projected, viewing angle will be wide, and a clear image will be displayed.

The reflective transparent screen has a diffuse reflectance light brilliance profile measured with a goniophotometer satisfying the following condition C:

C: the relative brilliance of the diffuse reflectance light at 60 degrees is 0.0001 or more, preferably from 0.0002 to 0.15, and more preferably from 0.0003 to 0.1 when the light entered in a 45 degrees angle against the parallel direction of the screen surface and when the brilliance in the specular reflection direction of 135 degrees is determined as 100.

By satisfying condition C, the brilliance of light that diffuse reflects in the angles at 60 degrees will be within a suitable range at the time when light entered in a 45 degrees angle against the parallel direction of the screen surface. Therefore, a screen having a wider viewing angle can be obtained.

The transparent screen has total light transmittance preferably from 60% to 98%, more preferably from 65% to 96%, further preferably from 70% to 94%, further more preferably from 75% to 92%. The transparent screen also has parallel beam transmittance preferably from 50% to 95%, more preferably from 55% to 92%, further preferably from 60% to 90%, further more preferably from 65% to 88%. When the total light transmittance and the parallel beam transmittance are within the above-described ranges, transparency will become high and the transmission visibility can be further improved. In the present invention, the total light transmittance and the parallel beam transmittance of the transparent screen can be measured in accordance with JIS-K-7361 and JIS-K-7136, using a turbidimeter (manufactured by NIPPON DENSHOKU INDUSTRIES CO., LTD., trade name: NDH-5000).

The transparent screen has image visibility of preferably 65% or more, more preferably from 70% to 98%, further preferably from 75% to 96%, further more preferably from 80% to 94%. When the image visibility of the transparent screen is within the above-described ranges, the image transmitted through the transparent screen will be extremely clear. In the present invention, the image visibility is a value of definition (%) when measured with an optical comb having a width of 0.125 mm in accordance with JIS K7374.

The transparent screen has luminous reflectance Y preferably from 1% to 6.5%, more preferably from 1.5% to 6.2%, further preferably from 2% to 6%, further more preferably from 2.5% to 5.7%. When the luminous reflectance Y of the transparent screen is within the above-described ranges, the image can be clearly projected. In the present invention, the luminous reflectance Y is based on JIS Z8701 against CIE standard illuminant D 65 which is based on JIS Z8720, and for example, it can be measured with a measuring mode called SCE (Specular Component Exclude) that excludes specular reflection light, by using a spectrophotometer (Type No.: CM-3600A, light source: D65; manufactured by KONICA MINOLTA INC.).

Figure 2:
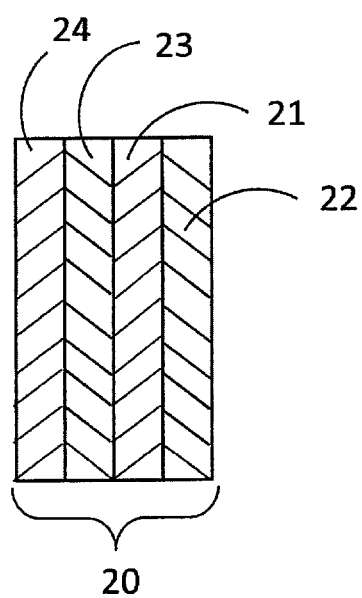
FIG. 2 is a cross-sectional view in the thickness direction of one embodiment of the film for the transparent screen according to the present invention.

A cross-sectional view in the thickness direction of one embodiment of the transparent screen according to the present invention is shown in FIG. 1. A transparent screen 10 comprises a binder 12 and a light diffusion layer 11 containing microparticles 13 which are dispersed in the binder 12. Also, a cross-sectional view in the thickness direction of one embodiment of the film for a transparent screen of a multilayer constitution is shown in FIG. 2. A transparent screen 20 comprises a light diffusion layer 21 laminated on one face of a backing layer 23 and further a protection layer 22 laminated on the light diffusion layer 21. Further, an adhesive layer 24 is laminated on the other side of the backing layer 23 (the face on the opposite side of the light diffusion layer 21). Each constitution of the transparent screen will be elaborated below.

(Light Diffusion Layer)

A light diffusion layer comprises a binder and microparticles. As for the microparticles, the following light reflective microparticles can be suitably used. By using such microparticles, light is anisotropically diffused and reflected in the light diffusion layer and use efficiency of light can be enhanced.

The light diffusion layer has a thickness t (μm) and the microparticles have a concentration c (% by mass) based on the binder, t and c preferably satisfying the following formula (I):

$$0.04 \leq (t \times c) \leq 30 \tag{I},$$

more preferably the following formula (I-2):

$$0.08 \leq (t \times c) \leq 25 \tag{I-2},$$

further preferably the following formula (I-3):

$$0.12 \leq (t \times c) \leq 20 \tag{I-3, and}$$

further more preferably the following formula (I-4):

$$0.2 \leq (t \times c) \leq 15 \tag{I-4}.$$

When thickness t and concentration c of the light diffusion layer satisfy the above-described formula (I), the microparticles in the binder of the light diffusion layer of the screen are dispersed in a sparsely state (concentration of the microparticles in the binder is low). Therefore, the proportion of light that transmits in a straightforward manner increases, and as a result, a clear image can be displayed on the screen without compromising the visibility of the transmitted light.

The light diffusion layer has a haze value of preferably 50% or less, more preferably from 1% to 40%, more preferably from 1.3% to 30%, and further more preferably from 1.5% to 20%. When the haze value is within the above ranges, transparency will be high and the visibility of the background image can be further improved. In the present invention, the haze value of the light diffusion layer can be measured in accordance with JIS-K-7136 using a turbidimeter (manufactured by NIPPON DENSHOKU INDUSTRIES CO., LTD., trade name: NDH-5000).

Thickness of the light diffusion layer is, without particular limitation, preferably from 0.1 µm to 20 mm, more preferably from 0.2 µm to 1.5 mm, further preferably from 1 µm to 10 mm, in view of application, productivity, handling, and transportation. When the thickness of the light diffusion layer is within the above described ranges, strength as a screen can be easily maintained. The light diffusion layer can be a molded article obtained by using organic or inorganic binders as follows, or a coated film shaped into a substrate consisted of glass or a resin, and the like. The light diffusion layer can be a single layer constitution or can be a multilayer constitution with 2 kinds or more of layers laminated with coating and the like, or 2 kinds or more of light diffusion layers adhered together with an adhesive and the like.

As for the light diffusion layer, a highly transparent binder is preferably used to obtain a highly transparent film. The binder include an organic and inorganic binders, and as for the organic binder, a thermoplastic resin, a thermoset resin, a self-crosslinkable resin, and an ionizing radiation-curable resin can be used, the examples thereof including: an acrylic resin, an acrylic urethane resin, a polyester acrylate resin, a polyurethane acrylate resin, an epoxy acrylate resin, a polyester resin, a polyolefin resin, an urethane resin, an epoxy resin, a polycarbonate resin, a cellulose resin, an acetal resin, a vinyl resin, a polystyrene resin, a polyamide resin, a polyimide resin, a melamine resin, a phenolic resin, a silicone resin, and a fluorine resin.

The thermoplastic resin includes an acrylic resin, a polyester resin, a polyolefin resin, a cellulose resin, a vinyl resin, a polycarbonate resin, and a polystyrene resin. Amongst these, it is preferable to use a methyl polymethacrylate resin, a polyethylene terephthalate resin, a polyethylene naphthalate resin, a polypropylene resin, a cycloolefin resin, a cellulose acetate propionate resin, a polyvinyl butyral resin, a polycarbonate resin, and a polystyrene resin. One of these resins may be used alone or two or more may be used in a combination.

The ionizing radiation-curable resin includes an acrylic resin, a urethane resin, an acrylic urethane resin, an epoxy resin, a silicone resin, and the like. Among these, those having an acrylate functional group, for example, those containing a relatively large amount of a monofunctional monomer such as ethyl (meth)acrylate, ethylhexyl (meth) acrylate, styrene, methyl styrene, N-vinylpyrrolidone and a polyfunctional monomer, such as polymethylolpropane tri (meth)acrylate, hexane diol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexane diol di(meth)acrylate, neopentyl glycol di(meth)acrylate as an oligomer or a prepolymer of a polyester resin, a polyether resin, an acrylic resin, an epoxy resin, a urethane resin, an alkyd resin, a spiroacetal resin, a polybutadiene resin, a polythiol polyene resin, a (meth) acrylate of a polyfunctional compound such as a polyalcohol and a reactivity diluent having a relatively low molecular weight are preferable. The ionizing radiation-curable resin may also be obtained by mixing a thermoplastic resin and a solvent.

The thermoset resin includes a phenolic resin, an epoxy resin, a silicone resin, a melamine resin, a urethane resin, a urea resin, and the like. Amongst these, an epoxy resin and a silicone resin are preferable. The self-crosslinkable resin includes a silicone resin, an epoxy resin, a urethane resin, an acrylic resin, and the like.

The highly transparent inorganic binder includes, for example, liquid glass, a glass material having a low softening point, or a sol-gel material. Liquid glass is a solution rich in alkali silicate and normally sodium is contained as an alkali metal. A representative liquid glass can be expressed by $Na_2O.nSiO_2$ (n: a given number of a positive value) and commercially available liquid glass includes sodium silicate solution manufactured by Fuji Kagaku Corp. can be used.

The glass material having a low softening point is glass having a softening temperature preferably in the range from 150 to 620° C., more preferably from 200 to 600° C., most preferably from 250 to 550° C. Such glass materials include a lead-free low softening point glass, or the like, obtainable by thermal treatment of a mixture comprising $PbO-B_2O_3$ based, $PbO-B_2O_3-SiO_2$ based, $PbO-ZnO-B_2O_3$ based acid component and metallic chloride. In order to improve the dispersibility and formability of the microparticles, solvents and organic solvents having a high boiling point can be mixed to the low softening point glass material.

Sol-gel materials are a group of compounds which hydrolytic polycondensation proceeds and the material cures by action of heat, light, catalysts, or the like. For example, they may be metal alkoxide (metal alcoholate), a metal chelate compound, halogenated metal, fluid glass, a spin-on glass, or reactants thereof and catalysts may be included therein to accelerate curing. Those having photoreactive functional groups such as an acrylic group in a moiety of a metal alkoxide functional group may be also possible. These may be used alone or in combination of multiple kinds, depending on the required physicalities. A curing body of the sol-gel material refers to a state where the polymerization reaction of the sol-gel material has been sufficiently progressed. The sol-gel material chemically bonds and strongly adheres to the surface of an inorganic substrate in the course of polymerization reaction. Accordingly, by using the curing body of the sol-gel material as a cured layer, a stable cured layer can be formed.

Metal alkoxides are a group of compounds obtainable from a reaction of any metallic species with water or organic solvents by hydrolysis catalysts, and are a group of compounds which any metallic species and functional groups such as a hydroxyl group, a methoxy group, an ethoxy group, a propyl group, an isopropyl group, or the like, are bonded. Metallic species of a metal alkoxide include silicon, titanium, aluminum, germanium, boron, zirconium, tungsten, sodium, potassium, lithium, magnesium, tin, or the like.

A metal alkoxide in which the metallic species is silicon includes, for example, dimethyldiethoxysilane, diphenyldiethoxysilane, phenyltriethoxysilane, methyltriethoxysilane (MTES), vinyltriethoxysilane, p-styryltriethoxysilane, methylphenyldiethoxysilane, 2-(3,4-epoxycyclohexyl)ethyltriethoxysilane, 3-glycidoxypropyltriethoxysilane, 3-glycidoxypropylmethyldiethoxysilane, 3-methacryloxypropylmethyldiethoxysilane, 3-methacryloxypropyltriethoxysilane, 3-acryloxypropyltriethoxysilane, N-2-(aminoethyl)-3-aminopropylmethyldiethoxysilane, N-2-(aminoethyl)-3-aminopropyltriethoxysilane, 3-aminopropyltriethoxysilane, 3-ureidopropyltriethoxysilane, 3-mercaptopropylmethyldiethoxysilane, 3-mercaptopropyltriethoxysilane, triethoxysilane, diphenylsilanediol, dimethylsilanediol, or a group of compounds in which the ethoxy group of these group of compounds are substituted with a methoxy group, a propyl group, an isopropyl group, a hydroxyl group, or the like. Amongst these, especially preferred are tetramethoxysilane (TMOS) in which the ethoxy group of triethoxysilane (TEOS) is substituted by a methoxy group and TEOS. These may be used alone or in a combination of multiple kinds.
(Solvent)

These organic and inorganic binders may further comprise a solvent, if necessary. The solvent is not limited to organic solvents and solvents used in general coating compositions can be used. For example, a hydrophilic solvate, represented by water, can also be used. When the binder of the present invention is a liquid, the solvent need not be contained.

Specific examples of the solvent according to the present invention include, for example, alcohols such as methanol, ethanol, isopropyl alcohol (IPA), n-propanol, butanol, 2-butanol, ethylene glycol, and propylene glycol; aliphatic carbon hydrides such as hexane, heptane, octane, decane, and cyclohexane; aromatic carbon hydrides such as benzene, toluene, xylene, mesitylene, and tetramethylbenzene; ethers such as diethylether, tetrahydrofuran, and dioxane; ketones such as acetone, methyl ethyl ketone, isophorone, cyclohexanone, cyclopentanone, and N-methyl-2-pyrrolidone; ether alcohols such as butoxyethyl ether, hexyloxy ethyl alcohol, methoxy-2-propanol, and benzyloxy ethanol; glycols such as ethylene glycol and propylene glycol; glycol ethers such as ethylene glycol dimethylether, diethylene glycol dimethyl ether, propylene glycol monomethyl ether acetate, cellosolve, methyl cellosolve, ethyl cellosolve, carbitol, methyl carbitol, ethyl carbitol, butyl carbitol, propylene glycol monomethyl ether, propylene glycol monoethyl ether, dipropylene glycol monomethyl ether, dipropylene glycol monoethyl ether, triethylene glycol monomethyl ether, and triethylene glycol monoethyl ether; esters such as ethyl acetate, butyl acetate, ethyl lactate, and γ-butylolactone; phenols such as phenol and chlorophenol; amides such as N,N-dimethyl formamide, N,N-dimethyl acetamide, and N-methylpyrrolidone; halogenated solvates such as chloroform, methylene chloride, tetrachloroethane, monochlorobenzene, and dichlorobenzene; hetero element containing compounds such as carbon bisulfide; water; and mixed solvates thereof. The amount of solvates to be added can be appropriately adjusted, depending on, for example, the kind of binders or microparticles, or the viscosity range suitable for the manufacturing steps to be discussed below.

(Light Reflective Microparticles)

The light reflective microparticles may be in a shape of a substantially spherical form or a flake form. When the light reflective microparticles are in a substantially spherical shape, the median diameter of the primary particles is preferably from 0.1 to 2500 nm, more preferably from 0.2 to 1500 nm, further preferably from 0.5 to 500 nm. When the median diameter of the primary particles of the light reflective microparticles is within the above ranges, a sufficient diffusion effect of projection light can be obtained without compromising the transmission visibility, whereby a clear image can be projected on the transparent screen. In the present invention, the median diameter ($D_{50}$) of the primary particles of the light reflective microparticles can be obtained from the particle distribution measured using a particle size distribution measurement apparatus (manufactured by Otsuka Electronics Co., Ltd., product name: DLS-8000) by a dynamic light scattering method.

When the light reflective microparticles are in a flake form shape, the median diameter of the primary particles is preferably from 0.01 to 100 μm, more preferably from 0.05 to 80 μm, further preferably from 0.1 to 50 μm, further more preferably from 0.5 to 30 μm, and most preferably from 1 to 10 μm. Further, the light reflective microparticles have an average aspect ratio (=average diameter/average thickness of the light reflective microparticles) preferably from 3 to 800, more preferably from 4 to 700, further preferably from 5 to 600, further more preferably from 10 to 500. When the average diameter and the average aspect ratio of the light reflective microparticles are within the above ranges, a sufficient scattering effect of projection light can be obtained without compromising the transmission visibility, whereby a clear image can be projected on the transparent screen. In the present invention, the average diameter of the light reflective microparticles was measured with a laser diffraction particle size distribution measurement apparatus (Part No.: SALD-2300; manufactured by Shimadzu Corporation). The average aspect ratio was calculated from an SEM (Trade Name: SU-1500; manufactured by Hitachi High Technologies Corporation) image.

A bright material which can be processed into a flake form can be suitably used for the flake form light reflective microparticles. Regular reflectance of the light reflective microparticles is preferably 12.0% or more, more preferably 15.0% or more, and further preferably from 20.0% to 80.0%. In the present invention, the regular reflectance of the light reflective microparticles is the value measured in accordance with the following manner.

(Regular Reflectance)

Regular reflectance is measured by using a spectrophotometer (Part No.: CM-3500d; manufactured by KONICA MINOLTA INC.). A powder material dispersed in an appropriate solvent (water or methyl ethyl ketone) is coated on a glass slide such that the film thickness will be 0.5 mm or more and then dried. The obtained glass plate with the coated film was measured for the regular reflectance of the coated part from the glass face.

As for the bright flake-form microparticles, for example, metallic microparticles such as aluminum, silver, copper, platinum, gold, titanium, nickel, tin, a tin-cobalt alloy, indium, and chromium, or metallic microparticles consisting of aluminum oxide and zinc sulfide, a bright material of a glass coated with metal or metal oxide, or a bright material of natural or synthetic mica coated with metal oxide can be used, depending on the kind of binder to be dispersed in.

Metal materials excellent in the reflexivity of projection light are used in the metallic microparticles. In particular, the metal material has a reflexivity R in the measured wave length of 550 nm, of preferably 50% or more, more preferably 55% or more, further preferably 60% or more, and further more preferably 70% or more. In the following, "reflexivity R" as used herein, refers to the reflexivity when light was entered from the perpendicular direction against the metal material. Reflexivity R can be calculated from the following formula (1), using values of refractive index n and extinction value k which are characteristic values of the metal material. n and k are described in, for example, Handbook of Optical Constants of Solids: Volume 1 (authored by Edward D. Palik) and P. B. Johnson and R. W Christy, *PHYSICAL REVIEW B*, Vol. 6, No. 12, 4370-4379 (1972).

$$R=\{(1-n)^2+k^2\}/\{(1+n)^2+k^2\} \qquad \text{formula (1)}$$

That is to say, reflexivity R (550) in the measured wavelength of 550 nm can be calculated from n and k measured at wavelength 550 nm. The metal material has an absolute value of difference between reflexivity R (450) in the measured wavelength 450 nm and reflexivity R (650) in the measured wavelength 650 nm within 25%, preferably within 20%, more preferably within 15%, further preferably within 10% based on reflexivity R (650) in the measured wavelength 550 nm. The use of such reflective transparent screen using such metal material will provide excellent reflexivity and color reproducibility of projection light and excellent performance as a screen.

The metal material used for the metallic microparticles have a real number term ε' of electric permittivity preferably from −60 to 0 and more preferably from −50 to −10. The real number term ε' of the electric permittivity can be calculated from the following formula (2) using values of the refractive index n and the extinction index k.

TABLE 1

| Metal | Refractive index n | | | Extinction index k | | |
|---|---|---|---|---|---|---|
| material | n(450) | n(550) | n(650) | k(450) | k(550) | k(650) |
| Aluminum | 0.62 | 0.96 | 1.49 | 5.48 | 6.70 | 7.82 |
| Silver | 0.15 | 0.12 | 0.14 | 2.48 | 3.35 | 4.15 |
| Platinum | 1.85 | 2.13 | 2.38 | 3.15 | 3.72 | 4.25 |
| Titanium | 1.70 | 1.89 | 2.22 | 2.27 | 2.62 | 2.99 |
| Nickel | 1.64 | 1.77 | 2.02 | 2.66 | 3.26 | 3.82 |
| Chromium | 2.34 | 3.17 | 3.10 | 3.14 | 3.33 | 3.33 |
| Copper | 1.17 | 0.95 | 0.21 | 2.40 | 2.58 | 3.67 |
| Gold | 1.50 | 0.35 | 0.17 | 1.88 | 2.73 | 3.15 |

TABLE 2

| Metal | Reflectiveness R | | | |R(450) − R(650)|/ R(550) × 100 | the real number term ε' of the electric permittivity | | |
|---|---|---|---|---|---|---|---|
| material | R(450) | R(550) | R(650) | [%] | ε'(450) | ε'(550) | ε'(650) |
| Aluminum | 0.92 | 0.92 | 0.91 | 1.1 | −29.65 | −43.96 | −58.93 |
| Silver | 0.92 | 0.96 | 0.97 | 5.2 | −6.12 | −11.19 | −17.20 |
| Platinum | 0.59 | 0.64 | 0.68 | 14.1 | −6.54 | −9.31 | −12.41 |
| Titanium | 0.45 | 0.50 | 0.54 | 18.0 | −2.28 | −3.27 | −4.01 |
| Nickel | 0.53 | 0.61 | 0.66 | 21.3 | −4.40 | −7.47 | −10.51 |
| Chromium | 0.55 | 0.55 | 0.56 | 1.8 | −4.41 | −1.04 | −1.48 |
| Copper | 0.55 | 0.64 | 0.94 | 60.9 | −4.39 | −5.74 | −13.42 |
| Gold | 0.39 | 0.85 | 0.94 | 64.7 | −1.26 | −7.34 | −9.89 |

$$\varepsilon = n^2 - k^2 \quad \text{formula (2)}$$

Although the present invention is not restricted by any theory, the real number term ε' of the electric permittivity for the metal material satisfying the above numerical range will generate the following action, whereby a suitable use as the reflection type transparent screen can be possibly attained. That is to say, when light enters into the metallic microparticles, an oscillating electric field is generated by light in the metallic microparticles; however, at the same time, a reversed electrical polarization is generated by free electrons, blocking the electric field. When presuming an ideal state that when the real number term ε' of the electric permittivity is 0 or less, light is completely blocked and light cannot enter into the metallic microparticles, i.e., there is no dispersion by the concavoconvex surface and no light absorbance by the metallic microparticles, it will mean that light is reflected totally at the surface of the metallic microparticles, and therefore, the reflexivity of light will be strong. When ε' is 0 or higher, oscillation of the free electrons of the metallic microparticles cannot follow the oscillation of light, thus, the oscillating electric field by light cannot be completely denied and light will enter into or transmit through the metallic microparticles. As a result, only a portion of light is reflected at the surface of the metallicaparticles and the reflexivity of light will become low.

Those satisfying the above-described reflexivity R and preferably also the electric permittivity may be used as the metal materials, and pure metal or alloy may also be used. Pure metal is preferably selected from the group consisting of aluminum, silver, platinum, titanium, nickel, and chromium. The refractive index n and the extinction index k in each measured wavelength for various metal materials are summarized in Table 1 and those values were used to calculate the reflexivity R and ε', which are summarized in Table 2.

The content of the light reflective microparticles in the light diffusion layer can be appropriately adjusted, depending on the shape of the light reflective microparticles, the regular reflectance, and the like. For example, the content of the light reflective microparticles is preferably from 0.0001 to 5.0% by mass, more preferably from 0.0005 to 3.0% by mass, further preferably from 0.001 to 2.0% by mass, and further more preferably from 0.001 to 0.5% by mass based on the binder. When the light reflective microparticles are dispersed in the binder in a low concentration as like the above ranges to form the light diffusion layer, the projection light emitted from the light source will be anisotropically diffused and reflected, allowing improvement in both the visibilities of the projection light and the transmitted light.

Conventionally known additives other than the microparticles may be added to the light diffusion layer depending on applications. Examples of the additive include an antioxidant, an ultraviolet absorber, a light stabilizer, an antistatic agent, a demolding agent, a flame retardant, a plasticizer, a lubricant, a color material, or the like. As for the color material, pigments or dyes such as carbon blacks, an azo-based pigment, an anthraquinone-based pigment, and a perinone-based pigment may be used. Also, for example, liquid-crystal compounds may be mixed.

(Backing Layer)

A backing layer is a layer for supporting the above-described light diffusion layer, which can improve the strength of the transparent screen. The backing layer is preferably formed by using a highly transparent material such as glass or a resin, which does not compromise the transmission visibility or the desired optical property of the transparent screen. For such a resin, a highly transparent resin similar to the light diffusion layer described above can be used. Also, a composite film or sheet formed by layering two or more resins described above may be used. The thickness of the backing layer can be appropriately changed depending on the type of the material so that the strength thereof will be suitable, and the thickness may be, for example, in the range of from 10 to 1000 µm.

(Protection Layer)

A protection layer is layered on the front side (observer side) of the transparent screen, and is a layer for imparting functions such as light resistance, scratch resistance, and stain resistance. The protection layer is preferably formed by using a resin which does not compromise the transmission visibility or the desired optical property of the transparent screen. For such a resin, for example, a resin curable by ultraviolet light or electron ray, i.e., an ionizing radiation-curable resin, a mixture obtained by adding a thermoplastic resin and a solvent to a radiation curable resin, and a heat setting resin. Among these, an ionizing radiation-curable resin is particularly preferable.

For a film forming component of the ionizing radiation-curable resin composition, preferably, those having an acrylate functional group, for example, those containing a relatively large amount of a monofunctional monomer such as ethyl (meth)acrylate, ethylhexyl (meth)acrylate, styrene, methyl styrene, N-vinylpyrrolidone and a polyfunctional monomer, such as polymethylolpropane tri(meth)acrylate, hexane diol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexane diol di(meth)acrylate, neopentyl glycol di(meth)acrylate as an oligomer or a prepolymer of a polyester resin, a polyether resin, an acrylic resin, an epoxy resin, a urethane resin, an alkyd resin, a spiroacetal resin, a polybutadiene resin, a polythiol polyene resin, a (meth)acrylate of a polyfunctional compound such as a polyalcohol and a reactivity diluent having a relatively low molecular weight can be used.

In order to make the above-described ionizing radiation-curable resin composition an ultraviolet light curable resin composition, acetophenones, benzophenons, Michler's benzoyl benzoates, α-amidoxime esters, tetramethyl thiuram monosulfides, and thioxanthones as photopolymerization initiators, and n-butyl amine, triethylamine, and poly-n-butylphosphine as photosensitizers may be added thereto to be used. In particular, in the present invention, a urethane acrylate as an oligomer and a dipentaerythritol hexa(meth) acrylate or the like as a monomer are preferably mixed.

An ionizing radiation-curable resin composition can be cured by normal curing methods, i.e., by irradiation of electron beams or ultraviolet light. For example, in the case of electron beam curing, electron beams having energy of 50 to 1000 KeV, and preferably 100 to 300 KeV released from a variety of electron beam accelerators such as Cockcroft-Walton-type, Van de Graaff-type, resonance transformer-type, insulating core transformer-type, linear-type, Dynamitron-type, and high-frequency-type is used, and in the case of ultraviolet light curing, ultraviolet light emitted from light beams such as an ultra-high pressure mercury lamp, a high pressure mercury lamp, a low pressure mercury lamp, a carbon arc, a xenon arc, and a metal halide lamp or the like can be used.

A protection layer can be formed by applying a coating of the above-described ionizing radiation (ultraviolet light)-curable resin composition on the surface of the above-described light diffusion layer by a method such as spin coating, die coating, dip coating, bar coating, flow coating, roll coating, or gravure coating, and by curing the coating by the above-described means. To the surface of the protection layer, a microstructure such as a concavoconvex structure, a prism structure, or a microlens structure can also be provided depending on the purposes.

(Adhesive Layer)

An adhesive layer is a layer for sticking a film to the transparent screen. The adhesive layer is preferably formed by using an adhesive composition which does not compromise the transmission visibility or the desired optical property of the transparent screen. Examples of the adhesive composition include a natural rubber, a synthetic rubber, an acryl resin, a polyvinyl ether resin, a urethane resin, a silicone resin and the like. Specific examples of the synthetic rubber include a styrene-butadiene rubber, an acrylonitrile-butadiene rubber, a polyisobutylene rubber, an isobutylene-isoprene rubber, a styrene-isoprene block copolymer, a styrene-butadiene block copolymer, and a styrene-ethylene-butylene block copolymer. Specific examples of the silicone resin include dimethyl polysiloxane. One of these adhesives can be used alone or two or more may be used in combination. Among these, an acrylic adhesive is preferred.

The acrylic resin adhesive at least includes an alkyl ester (meth)acrylate monomer and is formed by polymerization. Generally it is a copolymer of an alkyl ester (meth)acrylate monomer having an alkyl group having 1 to about 18 carbon atoms and a monomer having a carboxyl group. (Meth) acrylic acid means acrylic acid and/or methacrylic acid. Examples of the alkyl ester (meth)acrylate monomer include methyl (meth)acrylate, ethyl (meth)acrylate, n-propyl (meth)acrylate, sec-propyl (meth)acrylate, n-butyl (meth) acrylate, sec-butyl (meth)acrylate, tert-butyl (meth)acrylate, isoamyl (meth)acrylate, n-hexyl (meth)acrylate, cyclohexyl (meth)acrylate, n-octyl (meth)acrylate, isooctyl (meth)acrylate, 2-ethylhexyl (meth)acrylate, undecyl (meth)acrylate, and lauryl (meth)acrylate. Also, the above-described alkyl ester (meth)acrylate is usually copolymerized at a ratio of 30 to 99.5 parts by mass in the acrylic adhesive.

A commercially available adhesive may be used, and examples thereof include SK-Dyne 2094, SK-Dyne 2147, SK-Dyne 1811L, SK-Dyne 1442, SK-Dyne 1435, and SK-Dyne 1415 (manufactured by Soken Chemical & Engineering Co., Ltd.), Oribain EG-655, and Oribain BPS5896 (manufactured by TOYO INK CO., LTD.) or the like (trade name), which can be suitably used.

(Reflection Protection Layer)

A reflection protection layer is a layer for preventing a reflection or a reflection of external light on the outermost surface of the transparent screen. The reflection protection layer may be layered on the front side (observer side) of the transparent screen or may be layered on both sides thereof. When such a film is used as the transparent screen, the reflection protection layer is particularly preferably layered on the observer side. The reflection protection layer is preferably formed by using a resin which does not compromise the transmission visibility or a desired optical property of the transparent screen. For such a resin, for example, a resin curable by ultraviolet light/electron beams, i.e., an ionizing radiation-curable resin, those obtained by adding a thermoplastic resin and a solvent to an ionizing radiation-curable resin, and a heat setting resin can be used. Among these, an ionizing radiation-curable resin is particularly preferred. To the surface of the reflection protection layer, a microstructure such as a concavoconvex structure, a prism structure, or a microlens structure can be imparted depending on the purposes.

A method of forming the reflection protection layer is not particularly limited, and a dry coating method such as pasting of a coating film, or direct deposition or sputtering on a film substrate; and a wet coating treatment method such as gravure coating, microgravure coating, bar coating, slide die coating, slot die coating, and dip coating can be used.

(Functional Layer)

The transparent screen according to the present invention may comprise, other than the layers described above, a variety of conventionally known functional layers. Examples of the functional layer include a light absorbing layer containing a dye, a colorant, or the like, an light diffusion layer such as a prism sheet, a microlens sheet, a Fresnel lens sheet, and a lenticular lens sheet, and light beam cut layer for ultraviolet light and infrared ray.

<Method for Manufacturing Transparent Screen>

A method for manufacturing the transparent screen according to the present invention comprises a step for forming the light diffusion layer. The light diffusion layer can be molded by known methods such as an extrusion molding method involving kneading and filming steps, a cast film method, gravure coating, microgravure coating, bar coating, slide die coating, slot die coating, a compression molding method, a cell casting method, and preferably, an extrusion molding method, an injection molding method, and a coating method can be used. Each step for the extrusion molding method will be described in details below as one example of the method for manufacturing the transparent screen.

(Kneading Process)

The kneading process can be performed by using a single- or a twin-screw kneading extruder. When the twin-screw kneading extruder is used, the resin, which is the organic binder and the microparticles are kneaded while applying a shear stress of 3 to 1,800 kPa, preferably 6 to 1,400 kPa on average over the whole length of the screw of the twin-screw kneading extruder to obtain a resin composition. When the shear stress is in the above-described ranges, the microparticles can be sufficiently dispersed in the resin. In particular, when the shear stress is 3 kPa or higher, the dispersion homogeneity of the microparticles can be more improved, and when the the shear stress is 1,800 kPa or lower, the resin is prevented from degradation, thereby preventing contamination of air bubbles in the film. The shear stress can be set within a desired range by regulating the twin-screw kneading extruder.

In the kneading process, after obtaining the microparticle-attached resin composition by sufficient homogenous mixing of the resin and the microparticles with a mixer, a microparticle-dispersed resin composition can also be obtained by kneading the microparticle-attached resin composition and the resin using a single- or twin-screw kneading extruder. As the mixer, a container revolution type mixer such as KRT series manufactured by KATO-RIKI MFG. CO., LTD., a revolution blade type mixer such as a ribbon type mixer manufactured by TOKUJU CORPORATION, or the like can be used. By using a resin composition sufficiently mixed by such a mixer, large inorganic particle aggregations can be prevented from forming, and a single-screw extruder can be used. The screw shape of the single-screw kneading extruder and the shear stress are not particularly limited, and a so-called full flight screw having a conveying element over the full length of the screw or a screw partially including a mixing and kneading element can also be used. In the present invention, a resin (master batch) to which microparticles are added in advance and a resin without the addition of the microparticles may be mixed together to be kneaded by a single-screw kneading extruder, thereby obtaining a resin composition. A dispersing agent which is usually used may also be used. The single-screw kneading extruder has a screw inserted inside the cylinder and the shape of the screw is not particularly limited.

Other than the resin and the microparticles, conventionally known additives may be added to the resin composition to the extent the transmission visibility and the desired optical performance of the transparent screen are not compromised.

A twin-screw kneading extruder used in the kneading process comprises a cylinder and two screws therein and is configured by combining screw elements. For the screw, a flight screw at least including a conveying element and a mixing and kneading element can be suitably used. The mixing and kneading element preferably includes at least one selected from the group consisting of a kneading element, a mixing element, and a rotary element. By using such a flight screw including a mixing and kneading element, the microparticles can be sufficiently dispersed in the resin while applying a desired shear stress.

(Film Manufacturing Process)

A film manufacturing process is a process in which the resin composition obtained in the kneading process is formed into a film. The film manufacturing method is not particularly limited, and a conventionally known method can be used to form the film made of the resin composition. For example, the resin composition obtained in the kneading process is provided to a melt extruder heated to a temperature (Tm to Tm+70° C.) higher than the melting point to melt the resin composition. For the melt extruder, a single-screw extruder, a twin-screw extruder, a vent extruder, a tandem extruder, or the like can be used depending on the purposes.

Subsequently, the molten resin composition is, for example, extruded into a sheet form by a die, for example, a T-die, and the extruded sheet is quenched and solidified by a revolving cooling drum or the like, thereby forming a film. When the film manufacturing process is performed in continuation with the above-described kneading process, the resin composition obtained in the kneading process in a molten state can be directly extruded into the sheet form by a die to form a film.

The film obtained in the film manufacturing process can be further uniaxially stretched or biaxially stretched by a conventionally known method. By stretching the film, the strength of the film can be improved.

(Layering Process)

A layering process is a process in which the backing layer, the protection layer, the adhesive layer, and the like are further layered on the resin film (light diffusion film) obtained in the film manufacturing process. The layering method for each layer is not particularly limited, and a conventionally known method can be used. When each layer is layered by dry lamination, an adhesive or the like may be used to the extent the transmission visibility or the desired optical property of the transparent screen is not compromised.

<Member for Vehicle>

A member for a vehicle according to the present invention comprises the transparent screen as described above. Examples of the member for a vehicle include a windshield or a side glass. When the member for a vehicle comprises the transparent screen described above, a clear image can be displayed on the member for a vehicle without providing a separate screen.

<Member for House>

A member for a house according to the present invention comprises the transparent screen described above. Examples of the member for a house include a window glass for a house, a glass wall for a convenient store or a shop along the street. When the member for a house comprises the transparent screen described above, a clear image can be displayed on the member for a house without providing a separate screen.

<Image Projection Device>

An image projection device according to the present invention comprises the transparent screen described above and a projection device that projects an image on the transparent screen from an angle of preferably ±10 degrees or more, more preferably ±15 to 70 degrees against the normal direction of the screen face of the transparent screen. The projection device is not particularly limited, as long as it is capable of projecting an image on the screen, and for example, a commercially available rear projector or a front projector can be used.

Figure 3:
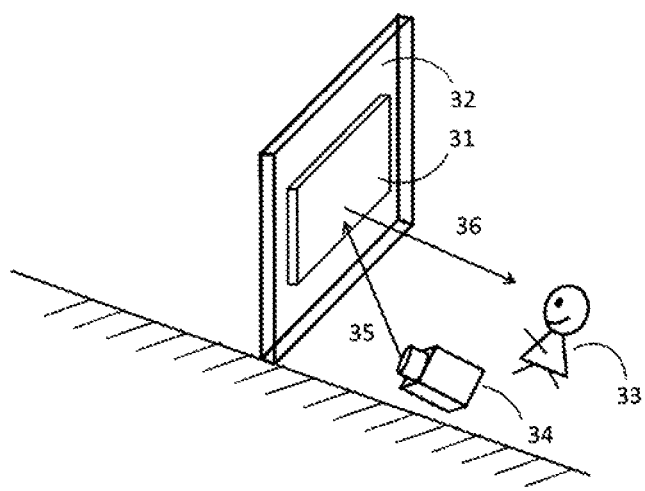
FIG. 3 is a schematic diagram illustrating one embodiment of the image projection device according to the present invention.

A schematic diagram illustrating one embodiment of the transparent screen and the image projection device according to the present invention is shown in FIG. 3. A transparent screen 31 is arranged at the observer 33 side of a transparent partition 32. The transparent screen 31 preferably includes an adhesive layer to attach to the transparent partition 32. The transparent screen 31 is a reflective screen (a front projection type screen), and the image projection device comprises the transparent screen 31 and a projection device 34 which is arranged at the same side as the observer 33 (the front side) and a ±10° position against the normal direction of the transparent screen. Projection light 35 emitted from the projection device 34 enters from the front side of the transparent screen 31, diffuses anisotropically by the transparent screen 31 so that the observer 33 recognizes diffuse light 36.

EXAMPLES

In the following, the present invention will be more specifically described with reference to Examples and Comparative Examples, but the present invention should not be construed to be limited to the following Examples.

The measuring methods of various physicalities and performance evaluation in the Examples and the Comparative Examples are as follows.

(1) Total Light Transmittance and Haze

Total light transmittance and haze were measured by using a turbidimeter (Part No.: NDH-5000; manufactured by NIPPON DENSHOKU INDUSTRIES CO., LTD.) in accordance with JIS K 7136.

(2) Parallel Beam Transmittance

Parallel beam transmittance was measured by using a turbidimeter (Part No.: NDH-5000; manufactured by NIPPON DENSHOKU INDUSTRIES CO., LTD.) in accordance with JIS K 7361-1.

(3) Diffuse Reflectance Light Brilliance Profile

Figure 4:
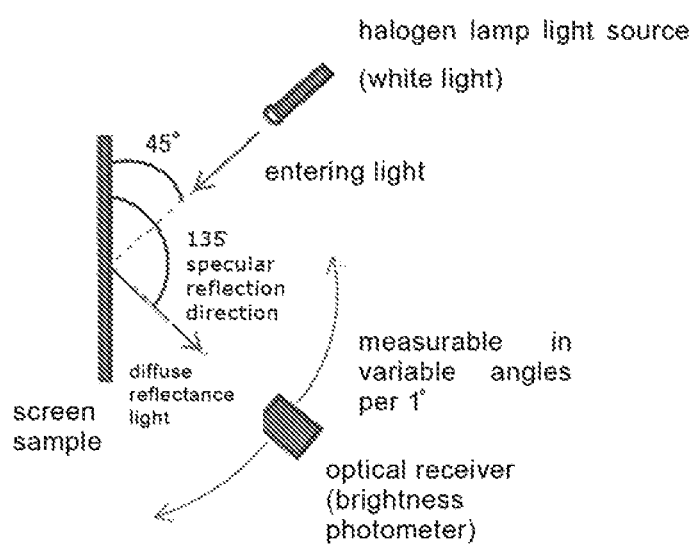
FIG. 4 is an outline drawing of the measuring conditions of the diffuse reflection light brilliance profile.

Diffuse reflectance light brilliance profile was measured by using a goniophotometer (product no: GSP-2; manufactured by Murakami Color Research Laboratory). Light was allowed to enter in an angle of 45 degrees against the parallel direction of the screen face and the diffuse reflectance light brilliance was measured at measuring angles varying from 60 to 170 degrees and relative brilliance was calculated when the brilliance in the specular reflection direction of 135 degrees is determined as 100. The outline drawing of the measuring method of the diffuse reflection light brilliance profile is shown in FIG. 4.

(4) Image Clarity

Image clarity is a value of definition (%) when measured with an optical comb having a width of 0.125 mm by using an image clarity measuring device (Part No.: ICM-IT; manufactured by Suga Test Instruments Co., Ltd.) in accordance with JIS K7374. The larger the value of the definition, the higher is the transmitted image clarity.

(5) Luminous Reflectance Y

Luminous reflectance Y is measured by using a spectrophotometer (Type No.: CM-3600A, light source: D65; manufactured by KONICA MINOLTA INC.) with a measuring mode called SCE (Specular Component Exclude) that excludes specular reflection light.

(6) Projected Image Visibility

An image was projected from a 50 cm away position in an angle of 45 degrees down from the normal direction of the transparent screen using an ultra short focus projector (EB-535W, manufactured by Seiko Epson Corporation). Then, after adjusting the focusing knob of the projector so that the image is focused on the screen face, the visibility of the projected image on the screen was evaluated by the following evaluation criteria, at a position 1 m away from the front of the screen (the same side as the projector with the screen in between).

[Evaluation Criteria]

◎: able to visualize projected image extremely clearly
○: able to visualize projected image clearly
Δ: able to visualize projected image but with a less clarity than the screen evaluated with ○, usable as screen
X: projected image was unclear, unsuitable as screen (7) Evaluation of Simultaneous Visibility of Background Image and Projected Image An image was projected from a 50 cm away position in an angle of 45 degrees down from the normal direction of the transparent screen using an ultra short focus projector (EB-535W, manufactured by Seiko Epson Corporation). Then, after adjusting the focusing knob of the projector so that the image is focused on the screen face, the visibilities of the projected image on the screen and the background image transmitted through the screen to be seen were evaluated simultaneously by the following evaluation criteria, at a position 1 m away from the front of the screen (the same side as the projector with the screen in between).

[Evaluation Criteria]

◎: able to simultaneously visualize back ground image and projected image extremely clearly
○: able to simultaneously visualize back ground image and projected image clearly
Δ: able to simultaneously visualize back ground image and projected image but with a less clarity than the screen evaluated with ○, usable as reflective screen
X: back ground image or projected image was unclear, unsuitable as reflective screen Manufacturing of Film for Transparent Screen Example 1

A polyethylene terephthalate (PET) pellet (manufactured by Bell Polyester Products, Inc., brand name: IFG8L) and 0.012% by mass of flake form aluminum microparticles A (light reflective microparticles, primary particles with average diameter: 1 μm, aspect ratio: 300, regular reflectance: 62.8%) based on the PET pellet were mixed for 30 minutes in a tumbler mixer to obtain a PET pellet which flake form aluminum was attached to its surface homogeneously. The obtained pellet was supplied to a hopper of a twin-screw kneading extruder with a strand die and a masterbatch in which flake form aluminum are kneaded in was obtained at an extrusion temperature of 250° C. The obtained masterbatch and the PET pellet (brand name: IFG8L) were mixed homogeneously in a proportion of 1:2, introduced into a hopper of a single-screw extruder with a T die, and extruded at extrusion temperature of 250° C. to produce a film in a thickness of 75 μm. Since the flake form aluminum microparticles concentration in the film was 0.004% by mass, the film (light diffusion layer) thickness t (μm) and the concentration c (% by mass) of the flake form aluminum microparticles based on the PET resin satisfied the following formula: t×c=0.3, and the haze was 4.3%. The obtained film was attached to a 2 mm-thick transparent glass plate by using an adhesive film (Panaclean PD-S1, thickness: 25 μm, manufactured by PANAC Co., Ltd.) to obtain a transparent screen.

The obtained transparent screen had a total light transmittance of 87.1%, a parallel beam transmittance of 83.9%, a luminous reflectance Y of 2.3%, and an image clarity of 95%.

Figure 5:
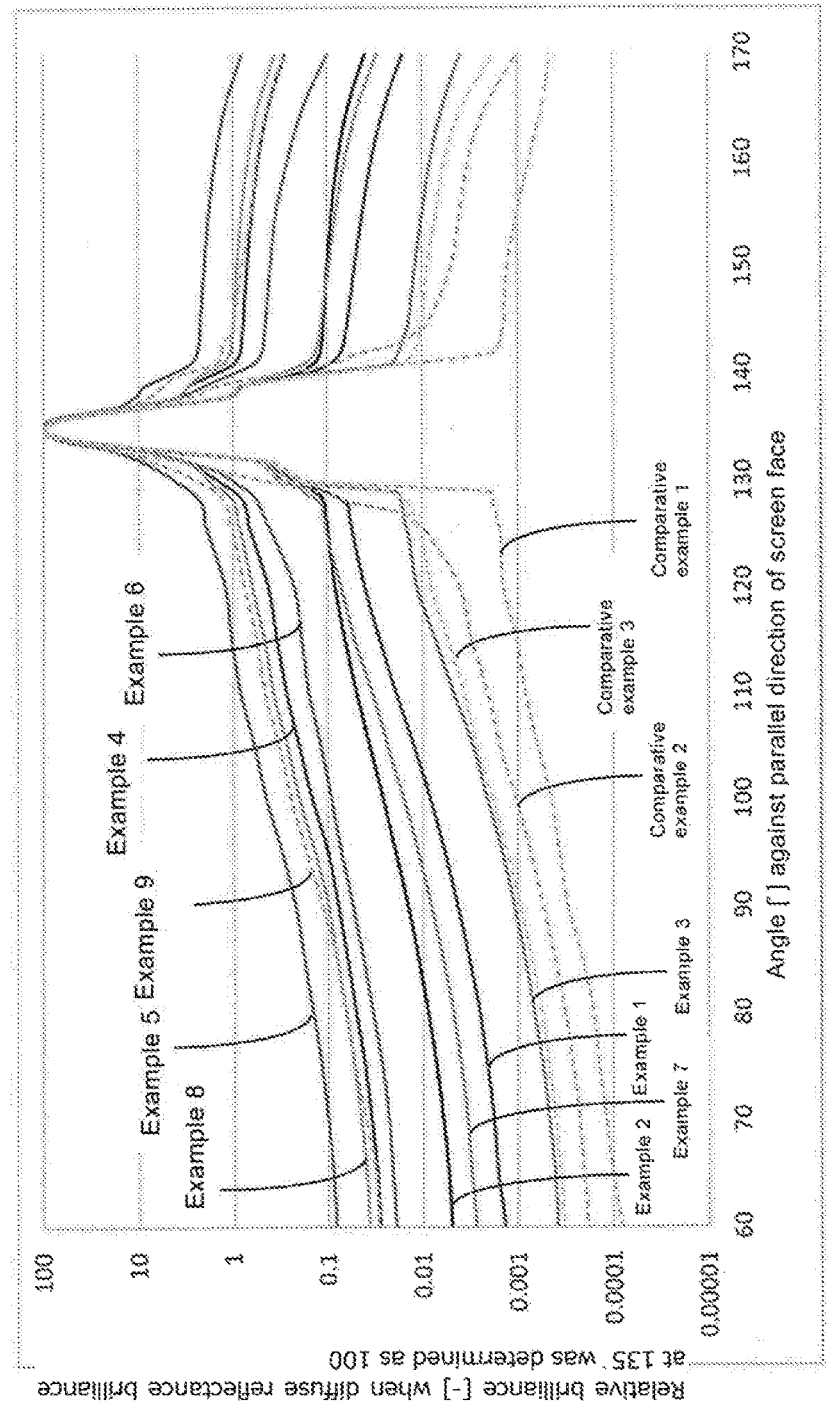
FIG. 5 shows the diffuse reflection light brilliance profiles of Examples 1 to 8 and Comparative Examples 1 to 4.

When the diffuse reflectance light brilliance profile of the transparent screen was measured with a goniophotometer, the relative brilliance of the diffuse reflectance light at 60 degrees was 0.0014, at 90 degrees was 0.0044, and at 120 degrees was 0.041, when light was entered at an angle of 45 degrees against the parallel direction of the screen face and the brilliance of diffuse reflectance light in the specular reflection direction (135 degrees) was determined as 100. This diffuse reflectance light brilliance profile is shown in FIG. 5. When an image was projected at an angle of 45 degrees with a reflective projector, extremely clear projection image and background image were able to be visualized at the same time.

Example 2

A transparent screen was obtained by attaching a commercially available low reflective film (Realook 2702 UV/NP-50, manufactured by NOF Corporation) to the film (light diffusion layer) side of the transparent screen obtained in Example 1.

The obtained transparent screen had a total light transmittance of 90.2%, a parallel beam transmittance of 85.9%, a luminous reflectance Y of 2.5%, and an image clarity of 96%.

When the diffuse reflectance light brilliance profile of the transparent screen was measured with a goniophotometer, the relative brilliance of the diffuse reflectance light at 60 degrees was 0.005, at 90 degrees was 0.014, and at 120 degrees was 0.083, when light was entered at an angle of 45 degrees against the parallel direction of the screen face and the brilliance of diffuse reflectance light in the specular reflection direction (135 degrees) was determined as 100. This diffuse reflectance light brilliance profile is shown in FIG. 5. When an image was projected at an angle of 45 degrees with a reflective projector, extremely clear projection image and background image were able to be visualized at the same time.

Example 3

A PET pellet (manufactured by Bell Polyester Products, Inc., brand name: IFG8L) and 0.005% by mass of flake form aluminum microparticles A based on the PET pellet were mixed for 30 minutes in a tumbler mixer to obtain a PET pellet which flake form aluminum was attached to its surface homogeneously. The obtained pellet was supplied to a hopper of a twin-screw kneading extruder with a strand die, extruded at extrusion temperature of 250° C. to obtain a masterbatch in which flake form aluminum are kneaded in. The obtained masterbatch and the PET pellet (brand name: IFG8L) were mixed homogeneously in a proportion of 1:4, introduced into a hopper of a single-screw extruder with a T die, and extruded at extrusion temperature of 250° C. to produce a film in a thickness of 50 μm. Since the flake form aluminum microparticles concentration in the film was 0.001% by mass, the film (light diffusion layer) thickness t (μm) and the concentration c (% by mass) of the flake form aluminum microparticles based on the PET resin satisfied the following formula: t×c=0.05, and the haze was 1.2%. The obtained film was attached to a 2 mm-thick transparent glass plate by using an adhesive film (Panaclean PD-S1, thickness: 25 μm, manufactured by PANAC Co., Ltd.) to obtain a transparent screen.

The obtained transparent screen had a total light transmittance of 90.1%, a parallel beam transmittance of 88.9%, a luminous reflectance Y of 1.1%, and an image clarity of 98%.

When the diffuse reflectance light brilliance profile of the transparent screen was measured with a goniophotometer, the relative brilliance of the diffuse reflectance light at 60 degrees was 0.00038, at 90 degrees was 0.0011, and at 120 degrees was 0.012, when light was entered at an angle of 45 degrees against the parallel direction of the screen face and the brilliance of diffuse reflectance light in the specular reflection direction (135 degrees) was determined as 100. This diffuse reflectance light brilliance profile is shown in FIG. 5. When an image was projected at an angle of 45 degrees with a reflective projector, clear projection image and background image were able to be visualized at the same time.

Example 4

A PET pellet (manufactured by Bell Polyester Products, Inc., brand name: IFG8L) and 0.012% by mass of flake form aluminum microparticles A based on the PET pellet were mixed for 30 minutes in a tumbler mixer to obtain a PET pellet which flake form aluminum was attached to its surface homogeneously. The obtained pellet was supplied to a hopper of a twin-screw kneading extruder with a strand die to obtain a masterbatch in which flake form aluminum are kneaded in, at an extrusion temperature of 250° C. The obtained masterbatch was used to prepare a flat plate having a thickness of 2000 μm with an injection molding machine (Trade Name: FNX-III; manufactured by Nissei Plastic Industrial Co., Ltd.), which was used directly as the transparent screen. The flat plate (light diffusion layer) thickness t (μm) and the concentration c (% by mass) of the flake form aluminum microparticles based on the PET resin satisfied the following formula: t×c=24, and the haze was 35.4%.

The obtained transparent screen had a total light transmittance of 71.0%, a parallel beam transmittance of 62.2%, a luminous reflectance Y of 5.9%, and an image clarity of 88%.

When the diffuse reflectance light brilliance profile of the transparent screen was measured with a goniophotometer, the relative brilliance of the diffuse reflectance light at 60 degrees was 0.028, at 90 degrees was 0.077, and at 120 degrees was 0.42, when light was entered at an angle of 45 degrees against the parallel direction of the screen face and the brilliance of diffuse reflectance light in the specular reflection direction (135 degrees) was determined as 100. This diffuse reflectance light brilliance profile is shown in FIG. 5. When an image was projected at an angle of 45 degrees with a reflective projector, the projection image was able to be visualized extremely clearly, while the background image was able to be visualized but not clearly enough since the transparency of the screen was relatively low.

Example 5

A transparent screen was obtained by attaching a commercially available low reflective film (Realook 2702 UV/NP-50, manufactured by NOF Corporation) to both sides of the flat plate made in Example 4.

The obtained transparent screen had a total light transmittance of 75.0%, a parallel beam transmittance of 65.0%, a luminous reflectance Y of 6.2%, and an image clarity of 86%.

When the diffuse reflectance light brilliance profile of the transparent screen was measured with a goniophotometer, the relative brilliance of the diffuse reflectance light at 60 degrees was 0.081, at 90 degrees was 0.22, and at 120 degrees was 1.2, when light was entered at an angle of 45 degrees against the parallel direction of the screen face and the brilliance of diffuse reflectance light in the specular reflection direction (135 degrees) was determined as 100. This diffuse reflectance light brilliance profile is shown in FIG. 5. When an image was projected at an angle of 45 degrees with a reflective projector, the projection image was able to be visualized extremely clearly, while the background image was able to be visualized but not clearly enough since the transparency of the screen was relatively low.

Example 6

A polycarbonate (PC) pellet (manufactured by Sumika Styron Polycarbonate Limited, brand name: SD2201W) and 0.01% by mass of flake form nickel microparticles based on the PC pellet (light reflective microparticles, primary particles with average diameter: 9 μm, aspect ratio: 90, regular reflectance: 16.8%) were mixed for 30 minutes in a tumbler mixer to obtain a PC pellet which flake form nickel was attached to its surface homogeneously. The material of a homogeneous mixture of the obtained pellet and the PC pellet (brand name: SD2201W) in a ratio of 1:4 was supplied to a hopper of a twin-screw kneading extruder with a strand die, followed by extrusion at a temperature of 250° C. to obtain a masterbatch in which flake form nickel are kneaded in. The flake form nickel microparticles dispersed in the masterbatch had a concentration of 0.002% by mass. This masterbatch was used to prepare a flat plate having a thickness of 2000 μm with an injection molding machine (Trade Name: FNX-III; manufactured by Nissei Plastic Industrial Co., Ltd.), which was used directly as the transparent screen. The flat plate (light diffusion layer) thickness t (μm) and the concentration c (% by mass) of the flake form nickel microparticles based on the PC resin satisfied the following formula: t×c=4, and the haze was 10.5%.

The obtained transparent screen had a total light transmittance of 82.1%, a parallel beam transmittance of 69.9%, a luminous reflectance Y of 4.2%, and an image clarity of 66%.

When the diffuse reflectance light brilliance profile of the transparent screen was measured with a goniophotometer, the relative brilliance of the diffuse reflectance light at 60 degrees was 0.018, at 90 degrees was 0.055, and at 120 degrees was 0.22, when light was entered at an angle of 45 degrees against the parallel direction of the screen face and the brilliance of diffuse reflectance light in the specular reflection direction (135 degrees) was determined as 100. This diffuse reflectance light brilliance profile is shown in FIG. 5. When an image was projected at an angle of 45 degrees with a reflective projector, clear projection image and background image were able to be visualized at the same time.

Example 7

A polymethylmethacrylate (PMMA) pellet (manufactured by Mitsubishi Rayon Co., Ltd., trade name: ACRYPET VH) was dissolved in a toluene solution to prepare a solution with PMMA concentration of 15% by mass. To this solution was added flake form aluminum microparticles A and stirred well to obtain a polymer solution in which the flake form aluminum microparticles are dispersed. The polymer solution was coated on to one side of a 2 mm-thick glass plate (Trade mark: CONTURAN, manufactured by SCHOTT Japan), in which the other side is treated with a reflection protection coating, by using a Baker type applicator SA201 (manufactured by TESTER Sangyo Co., Ltd.), followed by drying for 24 hours at 50° C. to obtain a transparent screen. The thickness of the PMMA resin layer (light diffusion layer) was 9 μm and the concentration of the flake form aluminum microparticles based on the PMMA resin was 0.005% by mass after dryness. The PMMA resin layer (light diffusion layer) thickness t (μm) and the concentration c (% by mass) of the flake form aluminum microparticles based on the resin satisfied the following formula: t×c=0.045, and the haze was 1.3%.

The obtained transparent screen had a total light transmittance of 95.8%, a parallel beam transmittance of 94.1%, a luminous reflectance Y of 1.1%, and an image clarity of 98%.

When the diffuse reflectance light brilliance profile of the transparent screen was measured with a goniophotometer, the relative brilliance of the diffuse reflectance light at 60 degrees was 0.0026, at 90 degrees was 0.0082, and at 120 degrees was 0.071, when light was entered at an angle of 45 degrees against the parallel direction of the screen face and the brilliance of diffuse reflectance light in the specular reflection direction (135 degrees) was determined as 100. This diffuse reflectance light brilliance profile is shown in FIG. 5. When an image was projected at an angle of 45 degrees with a reflective projector, the projection image was able to be visualized clearly, while the background image was able to be visualized but not clearly enough since the transparency of the screen was relatively low.

Example 8

A PET pellet (manufactured by Bell Polyester Products, Inc., brand name: IFG8L) and 0.96% by mass of flake form silver microparticles (light reflective microparticles, primary particles with average diameter: 1 μm, aspect ratio: 200, regular reflectance: 32.8%) based on the PET pellet were mixed for 30 minutes in a tumbler mixer to obtain a PET pellet which flake form silver microparticles were attached to its surface homogeneously. The obtained pellet was supplied to a hopper of a twin-screw kneading extruder with a strand die to obtain a masterbatch in which flake form silver microparticles are kneaded in, at an extrusion temperature of 250° C. The obtained masterbatch and the PET pellet (brand name: IFG8L) were mixed homogeneously in a proportion of 1:2, introduced into a hopper of a single-screw extruder with a T die, and extruded at an extrusion temperature of 250° C. to produce a film in a thickness of 75 μm. Since the flake form silver microparticles concentration in the film was 0.32% by mass, the film (light diffusion layer) thickness t (μm) and the concentration c (% by mass) of the flake form silver microparticles based on the PET resin satisfied the following formula: t×c=24, and the haze was 35.6%.

Also, polyvinylbutyral (PVB) powder (Brand name: Mowital B30H, manufactured by Kurary Co., Ltd.) was formed into a film with a twin-screw kneading extruder with a T die (KZW20TW, manufactured by Technovel Corporation) at 180° C. to form a 50 μm-film thick film.

These films were fusion bonded in the following constitution to obtain the transparent screen. The transparent screen had the constitution of: 2 mm-thick glass plate/PVB film/microparticles dispersed PET film/PVB film/2-mm thick glass plate, and a sample with such constitution was heating at 80° C. and fusion bonded to obtain the transparent screen.

The obtained transparent screen had a total light transmittance of 64.8%, a parallel beam transmittance of 52.1%, a luminous reflectance Y of 5.7%, and an image clarity of 77%.

When the diffuse reflectance light brilliance profile of the transparent screen was measured with a goniophotometer, the relative brilliance of the diffuse reflectance light at 60 degrees was 0.036, at 90 degrees was 0.099, and at 120 degrees was 0.63, when light was entered at an angle of 45 degrees against the parallel direction of the screen face and the brilliance of diffuse reflectance light in the specular reflection direction (135 degrees) was determined as 100. This diffuse reflectance light brilliance profile is shown in FIG. 5. When an image was projected at an angle of 45 degrees with a reflective projector, clear projection image and background image were able to be visualized at the same time.

Example 9

A PET pellet (manufactured by Bell Polyester Products, Inc., brand name: IFG8L) and 0.014% by mass of flake form aluminum microparticles A based on the PET pellet were mixed for 30 minutes in a tumbler mixer to obtain a PET pellet which flake form aluminum was attached to its surface homogeneously. The obtained pellet was supplied to a hopper of a twin-screw kneading extruder with a strand die to obtain a masterbatch in which flake form aluminum are kneaded in, at an extrusion temperature of 250° C. The obtained masterbatch was used to prepare a flat plate having a thickness of 2000 μm with an injection molding machine (Trade Name: FNX-III; manufactured by Nissei Plastic Industrial Co., Ltd.), which was used directly as the transparent screen. The flat plate (light diffusion layer) thickness t (μm) and the concentration c (% by mass) of the flake form aluminum microparticles based on the PET resin satisfied the following formula: t×c=28, and the haze was 37.8%.

The obtained transparent screen had a total light transmittance of 59.5%, a parallel beam transmittance of 47.2%, a luminous reflectance Y of 6.6%, and an image clarity of 86%.

When the diffuse reflectance light brilliance profile of the transparent screen was measured with a goniophotometer, the relative brilliance of the diffuse reflectance light at 60 degrees was 0.029, at 90 degrees was 0.11, and at 120 degrees was 0.76, when light was entered at an angle of 45 degrees against the parallel direction of the screen face and the brilliance of diffuse reflectance light in the specular reflection direction (135 degrees) was determined as 100. This diffuse reflectance light brilliance profile is shown in FIG. 5. When an image was projected at an angle of 45 degrees with a reflective projector, an extremely clear projection image was able to be visualized. On the other hand, the back ground image was able to be visualized but not clearly enough since the transparency of the screen was relatively low.

Example 10

A PET pellet (manufactured by Bell Polyester Products, Inc., brand name: IFG8L) and 0.1% by mass of flake form aluminum microparticles B (light reflective microparticles, primary particles with average diameter: 10 μm, aspect ratio: 150, regular reflectance: 32.8%) based on the PET pellet were mixed for 30 minutes in a tumbler mixer to obtain a PET pellet which flake form aluminum was attached to its surface homogeneously. The obtained pellet was supplied to a hopper of a twin-screw kneading extruder with a strand die to obtain a masterbatch in which flake form aluminum are kneaded in, at an extrusion temperature of 250° C. The obtained masterbatch was used to prepare a 10 μm-thick film (light diffusion layer) with a twin-screw kneading extruder, which was used directly as the transparent screen. The flat plate (light diffusion layer) thickness t (μm) and the concentration c (% by mass) of the flake form aluminum microparticles based on the PET resin satisfied the following formula: t×c=1, and the haze was 13.5%.

The obtained transparent screen had a total light transmittance of 64.4%, a parallel beam transmittance of 53.2%, a luminous reflectance Y of 2.7%, and an image clarity of 81%.

When the diffuse reflectance light brilliance profile of the transparent screen was measured with a goniophotometer, the relative brilliance of the diffuse reflectance light at 60 degrees was 0.020, at 90 degrees was 0.059, and at 120 degrees was 0.23, when light was entered at an angle of 45 degrees against the parallel direction of the screen face and the brilliance of diffuse reflectance light in the specular reflection direction (135 degrees) was determined as 100. When an image was projected at an angle of 45 degrees with a reflective projector, extremely clear projection image and background image were able to be visualized at the same time.

Comparative Example 1

A PET pellet (manufactured by Bell Polyester Products, Inc., brand name: IFG8L) and 0.003% by mass of flake form aluminum microparticles A based on the PET pellet were mixed for 30 minutes in a tumbler mixer to obtain a PET pellet which flake form aluminum microparticles were attached to its surface homogeneously. The obtained pellet was supplied to a hopper of a twin-screw kneading extruder with a strand die to obtain a masterbatch in which flake form aluminum are kneaded in, at an extrusion temperature of 250° C. The obtained masterbatch and the PET pellet (brand name: IFG8L) were mixed homogeneously in a proportion of 1:5, introduced into a hopper of a single-screw extruder with a T die, and extruded at an extrusion temperature of 250° C. to produce a film in a thickness of 75 μm. Since the flake form aluminum microparticles concentration in the film was 0.0005% by mass, the film (light diffusion layer) thickness t (μm) and the concentration c (% by mass) of the flake form aluminum microparticles based on the PET resin satisfied the following formula: t×c=0.0375, and the haze was 0.8%. The obtained film was attached to a 2 mm-thick transparent glass plate by using an adhesive film (Panaclean PD-S1, thickness: 25 μm) to obtain a transparent screen.

The obtained transparent screen had a total light transmittance of 90.8%, a parallel beam transmittance of 88.9%, a luminous reflectance Y of 0.6%, and an image clarity of 98%.

When the diffuse reflectance light brilliance profile of the transparent screen was measured with a goniophotometer, the relative brilliance of the diffuse reflectance light at 60 degrees was 0.000082, at 90 degrees was 0.0003, and at 120 degrees was 0.0014, when light was entered at an angle of 45 degrees against the parallel direction of the screen face and the brilliance of diffuse reflectance light in the specular reflection direction (135 degrees) was determined as 100. This diffuse reflectance light brilliance profile is shown in FIG. 5. When an image was projected at an angle of 45 degrees with a reflective projector, the background image was able to be visualized clearly, while a clear projected image was unable to be visualized since the image did not form sufficiently on the screen.

Comparative Example 2

A PET pellet (manufactured by Bell Polyester Products, Inc., brand name: IFG8L) and 2% by mass of dry spherical silica particles (Product name: NHM-4N, hydrophobic, median diameter of primary particles: 90 nm, manufactured by Tokuyama Corporation) based on the PET pellet were mixed for 30 minutes in a tumbler mixer to obtain a PET pellet which silica particles were attached to its surface homogeneously. The obtained pellet was supplied to a hopper of a twin-screw kneading extruder with a strand die to obtain a masterbatch in which silica particles are kneaded in, at an extrusion temperature of 250° C. The obtained masterbatch and the PET pellet (brand name: IFG8L) were mixed homogeneously in a proportion of 1:1, introduced into a hopper of a single-screw extruder with a T die, and extruded at an extrusion temperature of 250° C. to produce a film in a thickness of 75 μm. Since the silica particles concentration in the film was 1% by mass, the film (light diffusion layer) thickness t (μm) and the concentration c (% by mass) of silica particles based on the PET resin satisfied the following formula: t×c=75, and the haze was 25.3%. The obtained film was attached to a 2 mm-thick transparent glass plate by using an adhesive film (Panaclean PD-S1, thickness: 25 μm) to obtain a transparent screen.

The obtained transparent screen had a total light transmittance of 88.7%, a parallel beam transmittance of 78.9%, a luminous reflectance Y of 0.9%, and an image clarity of 82%.

When the diffuse reflectance light brilliance profile of the transparent screen was measured with a goniophotometer, the relative brilliance of the diffuse reflectance light at 60 degrees was 0.00017, at 90 degrees was 0.00055, and at 120 degrees was 0.0041, when light was entered at an angle of 45 degrees against the parallel direction of the screen face and the brilliance of diffuse reflectance light in the specular reflection direction (135 degrees) was determined as 100. This diffuse reflectance light brilliance profile is shown in FIG. 5. When an image was projected at an angle of 45 degrees with a reflective projector, the background image was able to be visualized clearly, while a clear projected image was unable to be visualized since the image did not form sufficiently on the screen.

Comparative Example 3

A transparent screen was obtained by attaching a commercially available low reflective film (Realook 2702 UV/NP-50, manufactured by NOF Corporation) to the PET film side of the transparent screen made in Comparative Example 1.

The obtained transparent screen had a total light transmittance of 93.2%, a parallel beam transmittance of 90.9%, a luminous reflectance Y of 0.6%, and an image clarity of 98%.

When the diffuse reflectance light brilliance profile of the transparent screen was measured with a goniophotometer, the relative brilliance of the diffuse reflectance light at 60 degrees was 0.00031, at 90 degrees was 0.00094, and at 120 degrees was 0.0082, when light was entered at an angle of 45 degrees against the parallel direction of the screen face and the brilliance of diffuse reflectance light in the specular reflection direction (135 degrees) was determined as 100. This diffuse reflectance light brilliance profile is shown in FIG. 5. When an image was projected at an angle of 45 degrees with a reflective projector, the background image was able to be visualized clearly, while a clear projected image was unable to be visualized since the image did not form sufficiently on the screen.

The details and evaluation results of the transparent screens made in the Examples and Comparative Examples are shown in Table 3.

TABLE 3

| | Type of microparticles | t × c | haze [%] | total light transmittance [%] | parallel beam transmittance [%] | luminous reflectance [%] | image clarity [%] | Relative brilliance of diffuse reflectance light against specular reflection direction | | | Image visibility | Simultaneous visibility of background image and projected image |
|---|---|---|---|---|---|---|---|---|---|---|---|---|
| | | | | | | | | 60 degrees | 90 degrees | 120 degrees | | |
| Example 1 | Flake form AL | 0.3 | 4.3 | 87.1 | 83.9 | 2.3 | 95 | 0.0014 | 0.0044 | 0.041 | ◎ | ◎ |
| Example 2 | Flake form AL | 0.3 | 4.3 | 90.2 | 85.9 | 2.5 | 96 | 0.005 | 0.014 | 0.083 | ◎ | ◎ |
| Example 3 | Flake form AL | 0.05 | 1.2 | 90.1 | 88.9 | 1.1 | 98 | 0.00038 | 0.0011 | 0.012 | ○ | ○ |
| Example 4 | Flake form AL | 24 | 35.4 | 71.0 | 62.2 | 5.9 | 88 | 0.028 | 0.077 | 0.42 | ◎ | Δ |
| Example 5 | Flake form AL | 24 | 35.4 | 75.0 | 65.0 | 6.2 | 86 | 0.081 | 0.22 | 1.2 | ◎ | Δ |
| Example 6 | Flake form Ni | 4 | 10.5 | 82.1 | 69.9 | 4.2 | 66 | 0.018 | 0.055 | 0.22 | ◎ | ◎ |
| Example 7 | Flake form AL | 0.045 | 1.3 | 95.8 | 94.1 | 1.1 | 98 | 0.0026 | 0.0082 | 0.071 | ○ | Δ |

TABLE 3-continued

|  | Type of microparticles | t × c | haze [%] | total light transmittance [%] | parallel beam transmittance [%] | luminous reflectance [%] | image clarity [%] | Relative brilliance of diffuse reflectance light against specular reflection direction | | | Image visibility | Simultaneous visibility of background image and projected image |
|---|---|---|---|---|---|---|---|---|---|---|---|---|
|  |  |  |  |  |  |  |  | 60 degrees | 90 degrees | 120 degrees |  |  |
| Example 8 | Flake form Ag | 24 | 35.6 | 64.8 | 52.1 | 5.7 | 77 | 0.036 | 0.099 | 0.63 | ⊚ | ○ |
| Example 9 | Flake form AL | 28 | 37.8 | 59.5 | 47.2 | 6.6 | 86 | 0.029 | 0.11 | 0.76 | ⊚ | Δ |
| Example 10 | Flake form AL | 1 | 13.5 | 64.4 | 53.2 | 2.7 | 81 | 0.020 | 0.059 | 0.23 | ⊚ | ⊚ |
| Comparative Example 1 | Flake form AL | 0.0375 | 0.8 | 90.8 | 88.9 | 0.6 | 98 | 0.000082 | 0.0003 | 0.0014 | X | X |
| Comparative Example 2 | Silica | 75 | 25.3 | 88.7 | 78.9 | 0.9 | 82 | 0.00017 | 0.00055 | 0.0041 | X | X |
| Comparative Example 3 | Flake form AL | 0.0375 | 0.8 | 93.2 | 90.9 | 0.6 | 98 | 0.00031 | 0.00094 | 0.0082 | X | X |

DESCRIPTION OF SYMBOLS

10 Transparent screen
11 Light diffusion layer
12 Binder
13 Microparticle
20 Transparent screen
21 Light diffusion layer
22 Protection Layer
23 Backing layer
24 Adhesive layer
31 Transparent screen
32 Transparent partition
33 Observer
34 Projection device
35 Projection light
36 Diffused light

The invention claimed is:

1. A reflective transparent screen comprising a light diffusion layer which comprises a binder and light reflective microparticles, wherein
the light reflective microparticles have a shape of a flake form and the content of the light reflective microparticles in the light diffusion layer is from 0.0001 to 3.0% by mass based on the binder,
the reflective transparent screen has a diffuse reflectance light brilliance profile measured with a goniophotometer characterized to satisfy the following conditions A and B:
A: a relative brilliance of a diffuse reflectance light at 90 degrees is 0.001 or more when a light entered in a 45 degrees angle against a parallel direction of a screen surface and when a brilliance in a specular reflection direction of 135 degrees is determined as 100; and
B: the relative brilliance of the diffuse reflectance light at 120 degrees is 0.01 or more when the light entered in a 45 degrees angle against the parallel direction of the screen surface and when the brilliance in the specular reflection direction of 135 degrees is determined as 100,
a thickness t (μm) of the light diffusion layer and a concentration c (% by mass) of the microparticles based on the binder satisfy the following formula (I):

$$0.04 \leq (t \times c) \leq 30 \quad \text{(I)}$$

primary particles of the light reflective microparticles have an average diameter of from 0.5 to 30 μm and an average aspect ratio of from 3 to 800,
wherein the light reflective microparticles are metallic particles selected from the group consisting of aluminum, silver, platinum, copper, gold, titanium, nickel, tin, tin-cobalt alloy, indium, chromium, titanium oxide, aluminum oxide, and zinc sulfide, a bright material of glass coated with metal or metallic oxides, or a bright material of natural or synthetic mica coated with metal or metallic oxides.

2. The reflective transparent screen according to claim 1, wherein the light diffusion layer has a haze value of from 1% to 40%.

3. The reflective transparent screen according to claim 1, wherein a luminous reflectance Y is from 1% to 6.5%.

4. The reflective transparent screen according to claim 1, wherein an image clarity is 65% or more.

5. The reflective transparent screen according to claim 1, wherein a total light transmittance is from 60% to 98%.

6. The reflective transparent screen according to claim 1, wherein a total light transmittance is from 60% to 98%.

7. A member for a vehicle comprising the reflective transparent screen according to claim 1.

8. A member for a house comprising the reflective transparent screen according to claim 1.

9. An image projection device comprising the reflective transparent screen according to claim 1 and a projection device which projects an image on the reflective transparent screen.

10. An image projection device comprising the reflective transparent screen according to claim 1 and a projection device which projects an image on the reflective transparent screen.

11. A reflective transparent screen comprising a light diffusion layer which comprises a binder and light reflective microparticles, wherein
the light reflective microparticles have a shape of a flake form and the content of the light reflective microparticles in the light diffusion layer is from 0.0001 to 3.0% by mass based on the binder,
the reflective transparent screen has a diffuse reflectance light brilliance profile measured with a goniophotometer characterized to satisfy the following conditions A and B:

A: a relative brilliance of a diffuse reflectance light at 90 degrees is 0.001 or more when a light entered in a 45 degrees angle against a parallel direction of a screen surface and when a brilliance in a specular reflection direction of 135 degrees is determined as 100; and B: the relative brilliance of the diffuse reflectance light at 120 degrees is 0.01 or more when the light entered in a 45 degrees angle against the parallel direction of the screen surface and when the brilliance in the specular reflection direction of 135 degrees is determined as 100, a thickness t (μm) of the light diffusion layer and a concentration c (% by mass) of the microparticles based on the binder satisfy the following formula (I):

$$0.04 \leq (t \times c) \leq 30 \qquad (I)$$

primary particles of the light reflective microparticles have an average diameter of from 0.5 to 30 μm and an average aspect ratio of from 3 to 800, a metal material used for the light reflective microparticles has a real number term $\varepsilon'$ of electric permittivity of from −60 to 0.

12. The reflective transparent screen according to claim 11, wherein
the metal material used for the light reflective microparticles has a reflectivity R in the measured wave length of 550 nm of 50% or more.

13. The reflective transparent screen according to claim 11, wherein
the light reflective microparticles are metallic particles selected from the group consisting of aluminum, silver, platinum, copper, gold, titanium, nickel, tin, tin-cobalt alloy, indium, chromium, titanium oxide, aluminum oxide, and zinc sulfide, a bright material of glass coated with metal or metallic oxides, or a bright material of natural or synthetic mica coated with metal or metallic oxides.

14. The reflective transparent screen according to claim 11, wherein the light diffusion layer has a haze value of from 1% to 40%.

15. The reflective transparent screen according to claim 11, wherein a luminous reflectance Y is from 1% to 6.5%.

16. The reflective transparent screen according to claim 11, wherein an image clarity is 65% or more.

17. A member for a vehicle comprising the reflective transparent screen according to claim 11.

18. A member for a house comprising the reflective transparent screen according to claim 11.

* * * * *